Patented Aug. 6, 1929.

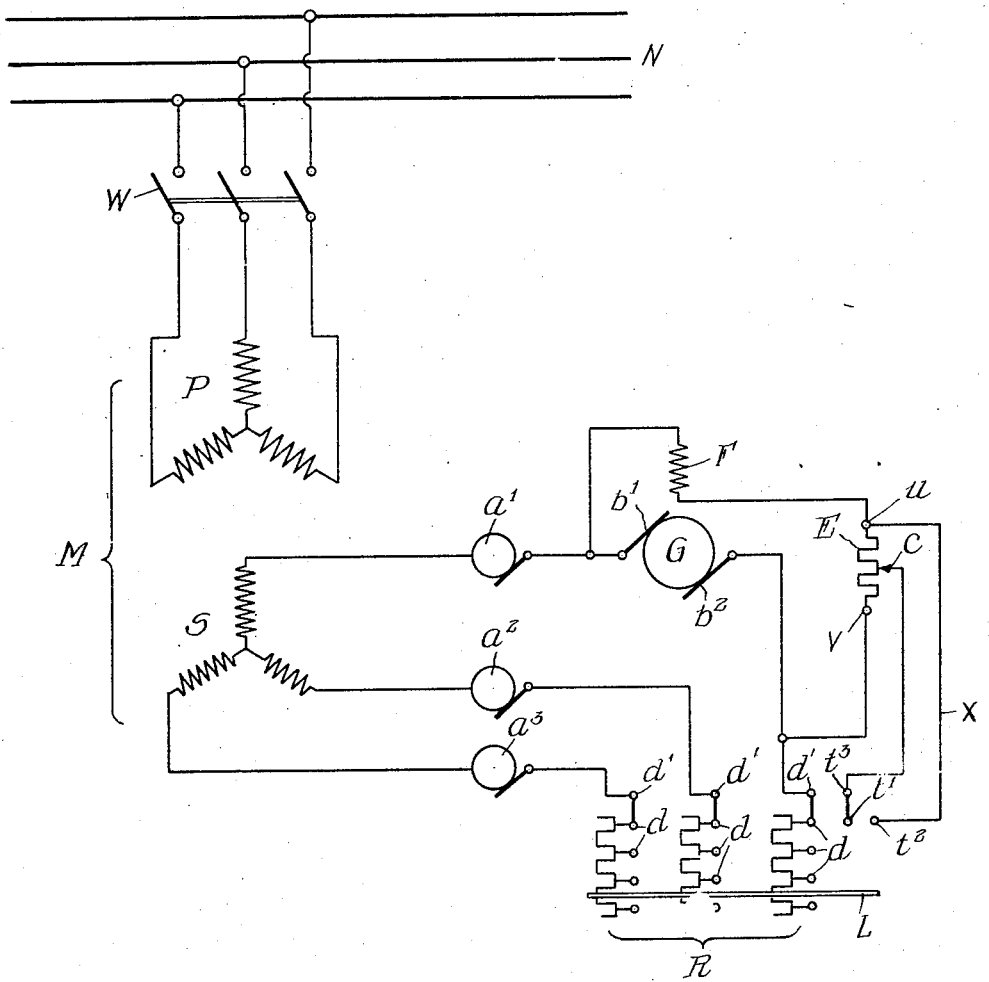

1,723,333

UNITED STATES PATENT OFFICE.

ADOLF DOSWALD, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

SYNCHRONOUS INDUCTION-MOTOR APPARATUS AND OPERATION.

Application filed May 13, 1926, Serial No. 108,720, and in Germany July 31, 1925.

This invention relates to synchronous induction motors and has to do with the apparatus and a method of operation to be employed in the starting of the motor.

The general object of the invention is the provision of apparatus and a method of operation whereby the proper excitation of an induction motor to the point of synchronous operation and during synchronous operation, may be effected with certainty and without the necessity for complicated or involved auxiliary apparatus or manipulations.

Other and further objects will be pointed out or indicated hereinafter or obvious to one skilled in the art upon an understanding of the invention.

For purpose of illustration of the invention one arrangement of apparatus is shown in the accompanying drawing, but this is not to be construed in any fashion such as to impose on the claims limitations not necessitated by the prior art.

In the drawing the figure is a diagram representative of a synchronous induction motor having a D. C. exciting generator and control resistances with appropriate switch mechanism.

For the purpose of properly exciting synchronous induction motors, it is customary to impress on the rotor windings a direct current supplied by a small auxiliary machine which is switched in when or after the starting resistances of the motor are cut out. It is undesirable to have the D. C. machine in the rotor circuit during the time the motor is being brought up to speed as the field induced by the D. C. excitation is not then rotating at synchronous speed and induces effects in the primary system which are likely to affect operation of apparatus therein and which also causes a voltage drop in the motor and increases the difficulty of pulling it into step.

The switching in of the exciter into the rotor circuit, after the starting resistance has been short circuited, involves the selection of a proper moment for the application of the auxiliary excitation, and, when performed automatically, requires rather complicated auxiliary apparatus. By exciting the generator from the secondary circuit of the motor its effects may be held to the proper time relationship with respect to the primary field of the motor, but the critical speed at which the D. C. machine will excite itself is not always the same. By the present invention it is ensured that the D. C. excitation is applied at the proper time to pull the motor into synchronism, and that the D. C. machine is itself properly excited to give the desired effect.

The nature of the invention may be ascertained from the illustrative example, wherein the reference character N designates the three-phase mains to which the primary P of the induction motor M is connected through the switch W. The secondary, or rotor S of the motor is connected to the starting resistance R by way of the slip rings $a^1$, $a^2$, $a^3$, the starting resistance in circuit being variable through operation of the switching lever L, so that the resistance may be cut out step by step during the starting acceleration of the motor. The D. C. exciter G is inserted in the lead between the slip ring $a^1$ and the starting resistance, and has a shunt field winding F with the regulating rheostat E in the field shunt across the brushes $b^1$, $b^2$. The starting resistance R has the several contacts $d$ whereby the resistance may be cut out by stages, the starting resistance being completely cut out when the switching member L reaches the contacts $d^1$. The regulating rheostat E of the D. C. machine has the adjustable contact $c$ whereby it may be partly short-circuited to the contacts $t^1$ and $t^3$, and the regulating rheostat may be completely short-circuited from the terminal $u$ through the connection $x$ to the contact $t^2$. The contacts $t^1$ and $t^2$ are arranged so that they are engaged by the switching lever L when it reaches the position at which the starting resistance R is cut out, while the contact $t^3$ is arranged so that it is engaged by the switching lever when the latter is engaged with the contacts $d^1$, which is the position for the normal running operation of the motor.

By virtue of this arrangement, therefore, the starting operation is as follows:—The switching lever L being in the position placing all of the starting resistance R in the rotor circuit, the switch W is closed and the motor starts. As the motor accelerates, the position of the switching lever L is changed to gradually cut out the starting resistance by stages, until the last contacts $d$ are reached. At this point the switching lever also closes the field circuit of the exciter through the contact $t^2$ and the connection $x$, resulting in the full excitation of the field F of the D. C. machine G, as at such time the regulating rheostat E is short-circuited. Finally the switching lever L is moved to the final position, in engagement with the contacts $d^1$ and $t^3$, which represents the normal operating position for the synchronous operation of the motor. In this position of the switching lever, the proper amount of the regulating resistance E of the D. C. machine is in its field circuit, the amount appropriate for obtaining the proper or so-called normal value of D. C. excitation of the motor having been established by the suitable adjustment of the contact $c$. By virtue of this arrangement and method of operation, therefore, it is ensured that the D. C. excitation is applied at the proper instant, and that the D. C. machine is itself adequately excited to deliver the desired quantity to the secondary of the motor. Moreover, it is made certain, that the synchronising torque at the moment of synchronising is positively brought up to a value which will pull the motor into synchronous operation.

It will be observed that the method can be practiced through the utilization of very simple apparatus as the regulation of the starting resistance and of the excitation of the D. C. machine may be effected from the same instrumentality.

What I claim is:—

1. In apparatus of the character described, a synchronous induction motor having polyphase primary and secondary circuits, a graduated starting resistance for connection in the secondary circuit, a D. C. generator in the secondary circuit and having its field in shunt, a regulating resistance for the generator field, and a switching device common to and operable to substantially simultaneously vary the effectiveness of the starting resistance and field regulating resistance.

2. In apparatus of the character described, an induction motor having primary and secondary circuits, a variable starting resistance for connection in the secondary circuit, an exciting generator having its field energized from the secondary circuit, a regulating resistance for the generator field, contacts arranged for connection with each other to provide for short-circuiting of the starting resistance and field regulating resistance, and a switching device common to said contacts and being operable to effect substantially simultaneous connection of the same with each other.

3. In apparatus of the character described, an induction motor having a primary and a secondary circuit, an exciting generator in the secondary circuit, said generator having a field energized from the secondary circuit, a regulating resistance for the said field, a variable resistance for connection in the secondary circuit, a switching device for varying the starting resistance effective in the secondary circuit, and connections from the field circuit of the generator for cooperation with said switching device for short-circuiting the field regulating resistance when the starting resistance is cut out.

4. In apparatus of the character described, an induction motor having a primary circuit and a secondary circuit, an exciting generator having its field energized from the secondary circuit, a variable starting resistance for connection in the secondary circuit, a switching device operable to connect the generator in the secondary circuit and cut out the starting resistance, a regulating resistance for the generator field, and means forming part of the switching device and being operable to short-circuit the regulating resistance when the generator is switched into the secondary circuit.

5. In control apparatus for an induction motor having primary and secondary circuits, starting resistance for the secondary circuit, an exciting generator in said secondary circuit having a shunt field energized therefrom, a resistance in the generator field circuit, connections providing for short-circuiting of the whole or part of said resistance, and movable switch means common to said starting resistance and said connections and having initial and final positions and a position intermediate the same, said means cooperating with said starting resistance to cut out the same upon movement from said initial to said intermediate position, said means cooperating with said connections when in said intermediate position to provide for short-circuiting of the whole of said field resistance, said means cooperating with said connections when in said final position to provide for short-circuiting of part of said field resistance.

In testimony whereof I have hereunto subscribed my name at Zurich, Switzerland, on the 29 day of March, A. D. 1926.

ADOLF DOSWALD.